United States Patent Office 3,152,118
Patented Oct. 6, 1964

3,152,118
3-OXO-2-AZABICYCLO[3.2.2]NON-6-ENE-8,8,9,9-TETRACARBONITRILES
Leo A. Paquette, Portage Township, Kalamazoo County, Mich., assignor to The Upjohn Company, Kalamazoo, Mich., a corporation of Delaware
No Drawing. Filed Jan. 16, 1963, Ser. No. 251,756
5 Claims. (Cl. 260—239.3)

This invention relates to novel bicyclic lactams and is more particularly concerned with novel 3-oxo-2-azabicyclo-[3.2.2]non-6-ene-8,8,9,9-tetracarbonitriles of the formula:

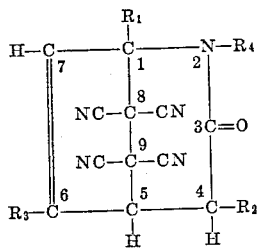

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, and wherein $R_4$ is selected from the group consisting of hydrogen, alkyl of 1 to 6 carbon atoms, inclusive, alkenyl of 3 to 6 carbon atoms, inclusive, alkynyl of 3 to 6 carbon atoms, inclusive, cycloalkyl of 5 to 10 carbon atoms, inclusive, and aralkyl of 7 to 11 carbon atoms, inclusive. $R_1$ and $R_2$ can be the same or different. When $R_3$ is alkyl, it can be the same as or different than $R_1$ or $R_2$. When $R_4$ is alkyl, it can be the same as or different than $R_1$, $R_2$, or $R_3$.

Examples of alkyl of 1 to 4 carbon atoms, inclusive, are methyl, ethyl, propyl, butyl, and isomeric forms thereof. Examples of alkyl of 1 to 6 carbon atoms, inclusive, are methyl, ethyl, propyl, butyl, pentyl, hexyl, and isomeric forms thereof. Examples of alkenyl of 3 to 6 carbon atoms, inclusive are allyl, 1-methylallyl, 2-methylallyl (methallyl), 2-butenyl (crotyl), 3-butenyl, 1,2-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,3-dimethyl-2-butenyl, 1-ethyl-2-butenyl, 4-methyl-2-pentenyl, 5-hexenyl, and the like. Examples of alkynl of 3 to 6 carbon atoms, inclusive, are 2-propynyl (propargyl), 1-methyl-2-propynyl, 2-butynyl, 3-butynyl, 1-methyl-2-butynyl, 1-methyl-3-butynyl, 3-pentynyl, 1,2-dimethyl-3-butynyl, 4-pentynyl, 2-methyl-3-pentynyl, 3-hexynyl, and the like. Examples of cycloalkyl of 5 to 10 carbon atoms, inclusive, are cyclopentyl, cyclohexyl, 2-methylcyclopentyl, 2-methylcyclohexyl, 3-methylcyclohexyl, 4-methylcyclohexyl, 2-ethylcyclopentyl, 3-ethylcyclopentyl, 3-ethylcyclohexyl, 2-n-propylcyclopentyl, 3-isopropylcyclopentyl, 4-n-propylcyclohexyl, 2,3-dimethylcyclohexyl, 2-methyl-4-ethylcyclohexyl, cycloheptyl, 3-ethylcycloheptyl, cyclooctyl, 4-terbutylcyclohexyl, 2,3-dimethylcyclooctyl, cyclononyl, cyclodecyl, and the like. Examples of aralkyl of 7 to 11 carbon atoms, inclusive, are benzyl, phenethyl, 2-phenylpropyl, 3-phenylpropyl, 4-phenylbutyl, 1-napthylmethyl, 2-naphthylmethyl, and the like.

The novel 3-oxo-2-azabicyclo[3.2.2]non-6-ene-8,8,9,9-tetracarbonitriles of Formula I are useful for the treatment of topical fungal infections in mammals and other animals caused by fungi such as *Microsporum canis* and *Trichophyton rubrum*, or for eradicating such fungi from inanimate objects. Also they are useful in the treatment of plant infections caused by such fungi as *Alternaria solani*, *Schlerotinia fructiocala*, and *Fusarium oxysporum* var. *cubense*. Further, these compounds are useful for treating *Bacillus subtilis* infected breeding places of silkworms and for inhibiting the growth of *Streptococcus faecalis* and *Staphylococcus aureus* on utensils used in the preparation and serving of foods.

These compounds have also demonstrated anti-inflammatory activity as shown by the granuloma pouch technique in rats and are useful in treating inflammatory conditions topically, locally, and systemically in mammals, e.g., cattle, horses, dogs, and cats, and in birds, e.g., poultry. Tests with animals have also shown these compounds to have sedative and hypnotic effects, and the compounds are therefore useful for these purposes.

The novel 3-oxo-2-azabicyclo[3.2.2]non-6-ene-8,8,9,9-tetracarbonitriles of Formula I are also of value as intermediates in chemical synthesis. For example, reduction of the carbon-carbon double bond and one or more of the four nitrile groups, for example, by hydrogenation in the presence of a noble metal catalyst such as platinum, produces the corresponding saturated mono-, di-, tri-, or tetraamines. These amines form salts with thiocyanic acid which, condensed with formaldehyde, form resinous materials useful as pickling inhibitors according to U.S. Patents 2,425,320 and 2,606,155. These cyclic amines also form salts with fluosilicic acid which are useful as moth-proofing agents according to U.S. Patents 1,915,334 and 2,075,359. Also, one or more of the nitrile groups can be reduced to aminomethyl groups and the carbonyl oxygen atom can be replaced by two hydrogen atoms, both, for example, by reduction with lithium aluminum hydride, and the resulting amines used for the same purposes, i.e., to form pickling inhibitors and mothproofing agents. Moreover, the polyamines prepared from Formula I compounds by either method of reduction are useful in the preparation of amino resins, for example, by reaction with formaldehyde.

The novel tetracarbonitriles of Formula I are prepared by reacting a 1,3-dihydro-2H-azepin-2-one of the formula:

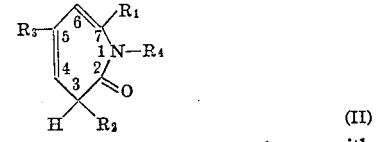

wherein $R_1$, $R_2$, $R_3$, and $R_4$ are as given above, with ethenetetracarbonitrile.

Ethenetetracarbonitrile is known in the art [e.g., Cairns et al., J. Am. Chem. Soc. 80, 2775–8 (1958)].

Compounds of Formula II wherein $R_4$ is hydrogen and $R_1$, $R_2$, and $R_3$ are as given above are prepared by reacting an ethereal solution of chloramide ($ClNH_2$) with the sodium salt of a phenol of the formula:

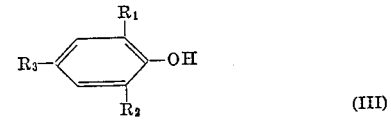

wherein $R_1$, $R_2$, and $R_3$ are as given above, in the presence of an additional quantity of the phenol. Reactants such as these have been interacted in a similar manner by Theilacker et al. [Angew. Chem. 72, 131 (1960)] but the reaction products were formulated by them as O-arylhydroxylamines.

Phenols of Formula III can be prepared by methods known in the art [e.g. U.S. Patents 2,831,898; 2,841,622; 2,841,623; and 2,841,624; British Patents 717,588 and 776,204; Kolka et al., J. Org. Chem. 22, 642–6 (1957); Stroh et al., Angew. Chem. 69, 699–706 (1957)]. Examples of phenols suitable for this reaction are 2,6-dimethylphenol (2,6-xylenol), 2,4,6-trimethylphenol (mesitol), 2,6-diethylphenol, 2,4,6-triethylphenol, 2,6-di-n-propylphenol, 2,6-diisopropylphenol, 2,4,6-triisopropylphenol, 2,6-diisobutylphenol, 2,4,6-tri-tert-butylphenol, 2-ethyl-6-methylphenol, 2-methyl-6-n-propylphenol, 2-ethyl-6-n-propylphenol, 2-tert-butyl-6-methylphenol, 2-sec-butyl-6-methylphenol, 2-tert-butyl-6-ethylphenol, 2-tert-butyl-6-isopropylphenol, 2-isobutyl-6-n-propylphenol, 4-sec-butyl-2,6-dimethylphenol, 4-tert-butyl-2,6-dimethylphenol, 2,4-dimethyl-6-ethylphenol, 2,4-dimethyl-6-n-propylphenol, 6-tert-butyl-2,4-dimethylphenol, 2,6-diethyl-4-methylphenol, 2,6-diisopropyl-4-methylphenol, 2,4-di-tert-butyl-6-methylphenol, 2,6-di-tert-butyl-4-ethylphenol, 2,4-di-tert-butyl-6-n-propylphenol, 2,6-diisobutyl-4-n-propylphenol, 2,6-di-tert-butyl-4-sec-butylphenol, 2-tert-butyl-4-ethyl-6-methylphenol, 2-sec-butyl-6-isopropyl-4-methylphenol, 2-n-butyl-6-tert-butyl-4-methylphenol, and the like.

Compounds of Formula II wherein $R_4$ is alkyl of 1 to 6 carbon atoms, inclusive, are prepared by reacting an alkali metal salt of a Formula III phenol as defined above with an N-chloroalkylamine of the formula:

wherein $R_5$ is alkyl of 1 to 6 carbon atoms, inclusive. Examples of alkyl of 1 to 6 carbon atoms, inclusive, are methyl, ethyl, propyl, butyl, pentyl, hexyl, and isomeric forms thereof. Examples of Formula III phenols suitable for this reaction are all of those specifically mentioned above. The phenol is transformed to the alkali metal salt by reaction with an alkali metal, for example, lithium, sodium, or potassium, or with an alkali metal base of sufficient basicity to react with the acidic hydrogen of the phenol. Examples of suitable alkali metal bases are the hydroxides, for example, lithium hydroxide, sodium hydroxide, and potassium hydroxide, and the alkoxides, for example, lithium methoxide, sodium methoxide, potassium methoxide, as well as other corresponding alkoxides such as the ethoxides, n-propoxides, isopropoxides, n-butoxides, tert-butoxides, and the like. Of these alkali metals and alkali metal bases, sodium metal and the sodium bases are preferred because they are relatively inexpensive and of particularly suitable reactivity for this purpose, and because the sodium phenoxides are of particularly suitable reactivity for the reaction with the N-chloroalklIamine. Sodium metal is particularly preferred for this purpose.

The alkali metal phenoxides are prepared by mixing the phenol of Formula III and the alkali metal or alkali metal base. Although an additional solvent such as a hydrocarbon or an ether unreactive toward the alkali metal or alkali metal base can be used in this reaction, such a solvent is usually unnecessary and its absence is preferred. It is also preferred to use more than one molecular equivalent of the phenol per atomic equivalent of the alkali metal or molecular equivalent of the alkali metal base, and to allow the excess phenol to serve as a solvent for the subsequent reaction with the N-chloroalkylamine. It is especially advantageous to do this when the alkali metal is used to prepare the alkali metal phenoxide. Suitable reaction conditions in this regard include about 1.5 to about 20 or even more molecular equivalents of the phenol per equivalent of the alkali metal or alkali metal base. Particularly preferred is the use of about 3 to 6 molecular equivalents of the phenol per equivalent of the alkali metal or alkali metal base. It is advantageous to heat the phenol to its melting point or above that temperature so that the reaction mixture can be stirred more easily and the salt-forming reaction encouraged.

N-chloroalkylamines of Formula IV can be prepared by methods known in the art [e.g., Coleman, J. Am. Chem. Soc. 55, 3001–5 (1933)]. Examples of N-chloroalkylamines suitable for this reaction are N-chloromethylamine, N-chloroethylamine, N-chloro-n-propylamine, N-chloroisopropylamine, N-chloro-n-butylamine, N-chloroisobutylamine, N-chloro-tert-butylamine, N-chloro-n-pentylamine, N-chloroisopentylamine, N-chloro-2-methylbutylamine, N-chloroneopentylamine, N-chloro-1,2-dimethylpropylamine, N-chloro-1,2-dimethylpropylamine, N-chloro-1-methylbutylamine, N-chloro-1-ethylpropylamine, N-chloro-1-methylbutylamine, N-chloro-n-hexylamine, N-chloroisohexylamine, N-chloro-1-methylpentylamine, N-chloro-1-ethylbutylamine, N-chloro-2-methylpentylamine, N-chloro-1,2-dimethylbutylamine, N-chloro-2,2-dimethylbutylamine, and the like. Although Coleman, supra, discloses only the production of ethereal solutions of N-chloroalkylamines, solutions of N-chloroalkylamines in other solvents, for example, pentane, can be prepared and reacted with the alkali metal salt of a phenol of Formula III. The important criterion in the choice of a solvent for the N-chloroalkylamine is unreactivity toward the N-chloroalkylamine and toward the alkali metal phenoxide with which the N-chloroalkylamine is to be reacted. It is also preferred that the N-chloroalkylamine solvent have a boiling point sufficiently low so that it vaporizes rapidly during reaction of the N-chloroalkylamine with the alkali metal phenoxide. Diethyl ether is preferred as an N-chloroalkylamine solvent. It is not advantageous to isolate the N-chloroalkylamine from the solvent used in its preparation.

The N-alkyl-1,3-dihydro-2H-azepin-2-one of Formula II is prepared by mixing the N-chloroalkylamine solution and the alkali metal phenoxide. This is preferably done by adding the N-chloroalkylamine solution, preferably below 25° C., gradually to a stirred mixture of alkali metal phenoxide in additional phenol at a temperature above the melting point of the phenol. Suitable reaction temperatures range from the melting point of the phenol up to about 250° C., preferably, about 100° to about 175° C. If the phenol does not have an appropriate melting point, an inert solvent, for example, a hydrocarbon such as toluene, xylene, cumene, tetrahydronaphthalene, octane, mineral oil, or the like, or an ether, for example, dioxane, dialkyl ethers of ethylene glycol, dialkyl ethers of diethylene glycol, or the like, can be present in the reaction mixture to cause the latter to be substantially fluid in the desired reaction temperature range. Although one molecular equivalent of the N-chloroalkylamine is theoretically required for reaction with the alkali metal phenoxide, it is preferred to use somewhat less N-chloroalkylamine than alkali metal phenoxide (based upon the amount of alkali metal or alkali metal base used to prepare the latter). For example, about 1.1 to about 2 moles of alkali metal phenoxide per mole of N-chloroalkylamine is preferred. The reaction between alkali metal phenoxide and N-chloroalkylamine usually takes place rapidly and, after addition of the latter to the reaction mixture is complete, it is usually sufficient to continue heating the reaction mixture, as during the addition, for say 10 to 60 minutes, although a longer reaction time may be required for some combinations of reactants. When the reaction is complete, it is preferred to remove any excess phenol, preferably by distillation, directly from the reaction mixture at reduced pressure. The residue is then cooled and the resulting desired N-alkyl-1,3-dihydro-2H-azepin-2-one is isolated by conventional techniques, for example by partition of any excess alkali metal phenoxide and the desired N-alkyl-1,3-dihydro-2H-azepin-2-one between diethyl ether and water. The N-alkyl1,3-dihydro-2H-azepin-2-one can be purified by conventional techniques, for example, by fractional distillation or vapor phase chromatography.

Compounds of Formula II wherein $R_4$ is alkyl of 1 to 6 carbon atoms, inclusive, alkenyl of 3 to 6 carbon atoms, inclusive, alkynyl of 3 to 6 carbon atoms, inclusive, cycloalkyl of 5 to 10 carbon atoms, inclusive, and aralkyl of 7 to 11 carbon atoms, inclusive, and wherein $R_1$, $R_2$, and $R_3$ are as given above, are prepared by reacting a 1,3-dihydro-2H-azepin-2-one of Formula II wherein $R_4$ is hydrogen and $R_1$, $R_2$, and $R_3$ are as given above, first with an alkali metal reactant selected from the group consisting of alkali metals, alkali metal hydrides, and alkali metal amides, and then with an organic halide of the formula R₄X, wherein X is a member selected from the group consisting of chloride, bromide, and iodide, and wherein R₄ is as given above. Examples of suitable alkali metal reactants are lithium metal, sodium metal, potassium metal, lithium hydride, sodium hydride, potassium hydride, lithium amide, sodium amide, and potassium amide. Sodium metal, sodium hydride, and sodium amide are preferred because they are relatively inexpensive and of particularly suitable reactivity for this purpose. The alkali metal, alkali metal hydride, or alkali metal amide is preferably used in a finely divided form, preferably in admixture with or as a suspension or dispersion in an inert liquid, for example, benzene, toluene, xylene, cumene, mesitylene, tetrahydronaphthalene, hexane, heptane, octane, mineral oil, dioxane, dimethylformamide, N-methyl-pyrrolidone, dimethyl sulfoxide, dialkyl ethers of ethylene glycol, dialkyl ethers of diethylene glycol, and mixtures thereof. Particularly preferred is an approximately 50 percent dispersion of micron-range sodium hydride crystals in mineral oil. An inert liquid of the type mentioned above can also with advantage be used as a solvent or diluent for the 1,3-dihydro-2H-azepin-2-one. The alkali metal reactant and the 1,3-dihydro-2H-azepin-2-one are mixed and the reaction between them is carried out at temperatures which can vary from about 0° to about 150° C., preferably from about 25° to about 100° C. The most suitable temperature will of course depend upon such factors as the reactivities of the alkali metal reactant and the 1,3-dihydro-2H-azepin-2-one, and the nature of the solvent. For example, relatively high reaction temperatures are usually necessary when using lithium reactants, and lower temperatures are preferred when using the more reactive materials such as potassium reactants. With the sodium reactants, for example, sodium hydride, reaction temperatures ranging from about 25° to about 100° C. are preferred but higher or lower temperatures can be used. It is preferred to react approximately equimolecular amounts of the 1,3-dihydro-2H-azepin-2-one and the alkali metal reactant, although an excess of either reactant can be used. The time required for completing the reaction will depend on the reaction temperature, the reactivities of the two reactants, and the nature of the solvent. Illustratively, with sodium hydride, the reaction frequently requires about 15 minutes to about 3 hours at temperatures ranging from about 50° to about 100° C.

After the reaction between the alkali metal reactant and the 1,3-dihydro-2H-azepin-2-one is complete, the metallo-organic reaction product can be isolated from the reaction mixture, for example, by removal of the solvent by evaporation or distillation, and can be purified if desired, for example, by washing or digestion with a suitable solvent, for example, additional portions of the reaction solvent. However, where the character of the reaction mixture indicates the absence of a substantial amount of impurities, it is preferred to use the entire reaction mixture containing the metallo-organic reaction product in the next step of the reaction sequence which is a reaction with an organic halide of formula R₄X wherein X and R₄ are as given above. The organic bromides and iodides are preferred for this next step because of their greater reactivity, although the organic chlorides can be used and are advantageous in some instances because they are usually less expensive. Suitable organic bromides are methyl bromide, ethyl bromide, n-propyl bromide, isopropyl bromide, n-butyl bromide, sec-butyl bromide, isobutyl bromide, n-pentyl bromide, isopentyl bromide, 2-methylbutyl bromide, 1,2-dimethylpropyl bromide, 1-ethylpropyl bromide, 1-methylbutyl bromide, n-hexyl bromide, isohexyl bromide, 1-methylpentyl bromide, 1-ethylbutyl bromide, 2 - methylpentyl bromide, 1,2 - dimethylbutyl bromide, allyl bromide, 2 - methylallyl bromide, 2-butenyl bromide 3 - butenyl bromide, 1,2 - dimethylallyl bromide, 2 - ethylallyl bromide, 1 - methyl-2-butenyl bromide, 2 - methyl - 2 - butenyl bromide, 3-methyl - 2 - butenyl bromide, 2,3 - dimethyl - 2 - butenyl bromide, 1,3 - dimethyl - 2 - butenyl bromide, 1 - ethyl-2-butenyl bromide, 4 - methyl - 2 - pentenyl bromide, 2-propynyl bromide, 2 - butynyl bromide, 1 - methyl-2-propynyl bromide, 3 - butynyl bromide, 1 - methyl - 3-butynyl bromide, 3 - pentynyl bromide, 4 - pentynyl bromide, 3 - hexynyl bromide, 2 - methyl - 3 - pentynyl bromide, cyclopentyl bromide, cyclohexyl bromide, 2-methylcyclopentyl bromide, 2 - methylcyclohexyl bromide, 3 - methylcyclohexyl bromide, 4-methylcyclohexyl bromide, 2 - ethylcyclopentyl bromide, 3 - ethylcyclopentyl bromide, 4 - ethylcyclohexyl bromide, 3 - isopropylcyclopentyl bromide, 2,3 - dimethylcyclohexyl bromide, cycloheptyl bromide, cyclooctyl bromide, 4 - tert - butylcyclohexyl bromide, cyclononyl bromide, cyclodecyl bromide, benzyl bromide, phenethyl bromide, 2 - phenylpropyl bromide, 3 - phenylpropyl bromide, 4 - phenylbutyl bromide, 1 - naphthylmethyl bromide, 2 - naphthylmethyl bromide, and the like. Suitable chlorides and iodides are those corresponding to the above bromides. These halides are either known in the art or can be prepared by methods known in the art, for example, by reaction of the corresponding alcohol with a phosphorus halide, by halogenation of a suitable saturated hydrocarbon, or by addition of a hydrogen halide to a suitable unsaturated hydrocarbon.

The organic halide is added to the metallo-organic reaction mixture either dropwise or in larger portions. Alternatively, the metallo-organic reaction mixture can be added in a similar manner to the organic halide. In either case, the organic halide can be dissolved in a suitable inert solvent, preferably in one or more of the solvents already present in the metallo-organic reaction mixture. Although only one molecular equivalent of the organic halide is required for reaction with one molecular equivalent of the metallo-organic reaction product (preferably calculated on the basis of the amount of 1,3-dihydro-2H-azepin-2-one used to prepare the latter), it is preferred to use an excess of the organic halide, for example, about 1.1 to about 5 or even more molecular equivalents of the halide per molecular equivalent of the metallo-organic reaction product. Particularly preferred is the use of about 1.4 to about 2 molecular equivalents of organic halide per molecular equivalent of metallo-organic reaction product. Suitable reaction times and reaction temperatures for the interaction of organic halide and metallo-organic reaction product depend upon the nature of the reactants and the solvent, and the usual inverse relationship between time and temperature is observed. The organic iodides are the most reactive and the organic chlorides the least reactive. Suitable reaction temperatures range from about 0° to about 200° C., preferably from about 10° to about 75° C. Usually, reaction temperatures ranging from about 25° to about 75° C. and reaction times ranging from about 1 to about 8 hours are satisfactory. The desired N-substituted, 1,3-dihydro-2H-azepin-2-one can be isolated from the reaction mixture by conventional methods, for example, by removal of reaction solvent by evaporation or distillation. If an alkali halide is present as a solid in the reaction mixture, it may with advantage be removed by filtration before the desired organic reaction product is isolated.

The reaction between ethenetetracarbonitrile and the 1,3-dihydro-2H-azepin-2-one of Formula II wherein $R_1$, $R_2$, and $R_3$ are as defined above, and wherein $R_4$ is hydrogen, alkyl, alkenyl, alkynyl, cycloalkyl, or aralkyl, also as defined above, is carried out by mixing these two reactants. It is preferred to react approximately equimolecular amounts of the two reactants to avoid the necessity of subsequent separation of the excess reactant from the desired adduct of Formula I. However, an excess of either reactant can be used, for example about 1.1 to about 3 or even more molecular equivalents of one reactant per molecular equivalent of the other reactant, and in some cases, such an excess is advantageous, especially when the reaction is slow and the yield of desired product is relatively small when equimolecular amounts of reactants are used. Usually, however, the reaction rate and yield of adduct are high enough so that there is no advantage in using an excess of either reactant.

Advantageously, the reaction between ethenetetracarbonitrile and Formula II compound can be carried out within the range of about 0° to about 100° C. At lower temperatures, the reaction rate tends to be inconveniently slow. At higher temperatures, the yield of the desired Formula I compound is usually lower than within the preferred reaction temperature range. Although it is not essential to use a reaction solvent, especially when the Formula II reactant is a liquid within the preferred reaction temperature range, it is preferred that a solvent be present in the reaction mixture. Suitable solvents are normally liquid aromatic hydrocarbons, e.g., benzene, toluene, xylene, and cumene; ethers, e.g., diethyl ether, tetrahydrofuran, and dioxane; ketones, e.g., acetone, methyl ethyl ketone, and diethyl ketone; and such solvents as chlorobenzene, tetrahydronaphthalene, and cyclohexane. The criteria for a solvent are that both reactants be moderately soluble therein and that the solvent not react with either reactant. There is a tendency for certain solvents, especially the aromatic hydrocarbons, to form complexes with ethenetetracarbonitrile [Merrifield et al., J. Am. Chem. Soc. 80, 2778–82 (1958)] but this tendency does not interfere with the reaction of the ethenetetracarbonitrile with the Formula II compound.

The time required for completion of the reaction between ethenetetracarbonitrile and Formula II compound will vary according to such factors as the reactivity of the latter, the reaction temperature, and the nature of the reaction solvent. The usual inverse relationship between reaction time and reaction temperature is observed. At about 25° C., the reaction usually requires from about 3 to about 36 hours.

After the reaction between ethenetetracarbonitrile and the Formula II reactant is complete, the Formula I product can be isolated by conventional techniques, for example, by evaporation of the solvent under reduced pressure. The Formula I products are usually solids at normal temperature and can be purified by recrystallization from a suitable solvent or pair of solvents, or by chromatography.

The invention can be more fully understood by the following examples.

*Example 1—1,3-Dihydro-3,5,7-Trimethyl-2H-Azepin-2-One*

Th sodium salt of 2,4,6-trimethylphenol in an excess of this phenol was reacted with chloramide, and an organic reaction product was isolated and purified, all by the method of Theilacker et al., supra. This organic reaction product was found to be 1,3-dihydro-3,5,7-trimethyl-2H-azepin-2-one; M.P. 132° C.

Analysis.—Calcd. for $C_9H_{13}NO$: C, 71.49; H, 8.67; N, 9.26. Found: C, 71.68; H, 8.47; N, 9.16. U.V. ($C_2H_5OH$) 252 m$\mu$ ($\epsilon$=6,050). I.R. (principal bands, mineral oil mull) 3200, 1695 cm.$^{-1}$.

Following the procedure of Example 1, but substituting for the 2,4,6-trimethylphenol, 2,6-dimethylphenol;
2,6-diethylphenol;
2,6-di-n-propylphenol;
2,6-diisopropylphenol;
2,6-diisobutylphenol;
2,6-di-n-butylphenol;
2,4,6-triethylphenol;
2,6-diethyl-4-methylphenol;
2,6-dimethyl-4-ethylphenol;
4-tertbutyl-2,6-dimethylphenol;
2,6-diisopropyl-4-methylphenol;
2,6-diisobutyl-4-n-propylphenol;
4-sec-butyl-2,6-dimethylphenol;
and 2,4,6-triisopropylphenol, there are obtained 1,3-dihydro-3,7-dimethyl-2H-azepin-2-one;
1,3-dihydro-3,7-diethyl-2H-azepin-2-one;
1,3-dihydro-3,7-di-n-propyl-2H-axepin-2-one;
1,3-dihydro-3,7-diisopropyl-2H-azepin-2-one;
1,3-dihydro-3,7-diisobutyl-2H-azepin-2-one;
1,3-dihydro-3,7-di-n-butyl-2H-azepin-2-one;
1,3-dihydro-3,5,7-triethyl-2H-azepin-2-one;
1,3-dihydro-3,7-diethyl-5-methyl-2H-azepin-2-one;
1,3-dihydro-3,7-dimethyl-5-ethyl-2H-azepin-2-one;
1,3-dihydro-5-tert-butyl-3,7-dimethyl-2H-azepin-2-one;
1,3-dihydro-3,7-diisopropyl-5-methyl-2H-azepin-2-one;
1,3-dihydro-3,7-diisobutyl-5-n-propyl-2H-azepin-2-one;
1,3-dihydro-5-sec-butyl-3,7-dimethyl-2H-azepin-2-one; and
1,3-dihydro-3,5,7-triisopropyl-2H-azepin-2-one, respectively.

*Example 2—1,3-Dihydro-1,3,7-Trimethyl-2H-Azepin-2-One*

Sodium metal (6.9 g.; 0.30 gram atom) in small pieces was added to 2,6-dimethylphenol (150 g.; 1.23 moles) with stirring above its melting point (49° C.). When the reaction was complete, a solution of N-chloromethylamine (16.4 g.; 0.25 mole) in 250 ml. of diethyl ether at −70° C. was added in a thin stream to the phenol-phenoxide mixture with stirring at 120° to 140° C. After an additional 15 minutes of heating and stirring, the reaction mixture was cooled to about 100° C. and excess 2,6-dimethylphenol was removed by distillation at 13 mm. pressure. The residue was cooled to about 25° C. and treated with a mixture of diethyl ether and water. The aqueous layer was separated and extracted with additional diethyl ether. The combined ethereal layers were dried and evaporated, and the residue was distilled, giving 7.1 g. of a pale yellow oil; B.P. 109–115° C. at 13 mm. Purification of this oil by vapor phase chromatography (225° C.; helium gas as a carrier; a cross-linked diethylene glycol adipate polymer as a column liquid), followed by evaporative distillation at 13 mm. gave colorless 1,3-dihydro-1,3,7-trimethyl-2H-azepin-2-one.

Analysis.—Calcd. for $C_9H_{13}NO$: C, 71.49; H, 8.67; N, 9.26. Found: C, 71.04; H, 8.71; N, 8.98.

*Example 3.—1,3-Dihydro-1,3,5,7-Tetramethyl-2H-Azepin-2-One*

The procedure of Example 2 was followed except that in place of the 2,6-dimethylphenol, there was used 2,4,6-trimethylphenol (167 g.; 1.23 moles). There was obtained 14.5 g. of a pale yellow liquid; B.P. 118–122° C. at 12 mm. Redistillation gave 1,3-dihydro-1,3,5,7-tetramethyl-2H-azepin-2-one; B.P. 121–122° C. at 12 mm.

Following the procedure of Example 2 but substituting for the combination of 2,6-dimethylphenol and N-chloromethylamine as reactants, 2,6-dimethylphenol and N-chloroethylamine;
2,6-diethylphenol and N-chloromethylamine;
2,6-diisopropylphenol and N-chloroisopropylamine;
2,4,6-triethylphenol and N-chloroethylamine;
2,6-diethyl-4-methylphenol and N-chloro-n-propylamine;
4-tert-butyl-2,6-dimethylphenol and N-chloro-tert-butylamine;
2,4,6-trimethylphenol and N-chloro-n-hexylamine;
2,6-dimethyl-4-ethylphenol and N-chloroisopentylamine;
2,6-di-n-butylphenol and N-chloro-n-butylamine;
and 2,4,6-triisopropylphenol and N-chloromethylamine, there are obtained 1,3-dihydro-3,7-dimethyl-1-ethyl-2H-azepin-2-one;
1,3-dihydro-3,7-diethyl-1-methyl-2H-azepin-2-one;
1,3-dihydro-1,3,7-triisopropyl-2H-azepin-2-one;
1,3-dihydro-1,3,5,7-tetraethyl-2H-azepin-2-one;
1,3-dihydro-3,7-diethyl-5-methyl-1-n-propyl-2H-azepin-2-one;

1,3-dihydro-1,5-di-tert-butyl-3,7-dimethyl-2H-azepin-2-one;
1,3-dihydro-1-n-hexyl-3,5,7-trimethyl-2H-azepin-2-one;
1,3-dihydro-3,7-dimethyl-5-ethyl-1-isopentyl-2H-azepin-2-one;
1,3-dihydro-1,3,7-tri-n-butyl-2H-azepin-2-one; and
1,3-dihydro-1-methyl-3,5,7-triisopropyl-2H-azepin-2-one, respectively.

*Example 4.—1,3-Dihydro-1,3,5,7-Tetramethyl-2H-Azepin-2-One*

A 51.5% sodium hydride suspension in mineral oil (9.0 g.; equivalent to 0.19 mole of sodium hydride) was added to a solution of 1,3-dihydro-3,5,7-trimethyl-2H-azepin-2-one (29.0 g.; 0.19 mole) in 150 ml. of dimethylformamide. The mixture was stirred at 50° C. for 1 hour. After cooling, methyl iodide (42.6 g.; 0.30 mole) was added in two portions. After stirring for 1 hour, 250 ml. of diethyl ether was added and the resulting slurry was filtered. The oil remaining after evaporation of the solvent in the filtrate was distilled to yield 29.45 g. of a colorless liquid; B.P. 115–120° C. at 11 mm. Redistillation gave 1,3-dihydro-1,3,5,7-tetramethyl-2H-azepin-2-one; B.P. 121.5° C. at 13 mm.; $n_D^{24}$ 1.5198.

*Analysis.*—Calcd. for $C_{10}H_{15}NO$: C, 72.69; H, 9.15; N, 8.48. Found: C, 72.32; H, 9.26; N, 8.59.

Following the procedure of Example 4 but substituting for the methyl iodide, isopropyl chloride; n-propyl iodide; isobutyl bromide; n-pentoyl bromide; n-hexyl chloride; allyl bromide; 2-methyl-2-butenyl bromide; 4-methyl-2-pentenyl chloride; 2-propynyl bromide; 3-pentynyl chloride; cyclopentyl chloride; cyclohexyl bromide; 4-tert-butylcyclohexyl chloride; benzyl bromide; and 1-naphthylmethyl chloride, there are obtained 1,3-dihydro-1-isopropyl-3,5,7-trimethyl-2H-azepin - 2 - one; 1,3-dihydro-1-n-propyl-3,5,7-trimethyl - 2H - azepin - 2 - one; 1,3-dihydro - 1 - isobutyl - 3,5,7 - trimethyl-2H-azepin-2-one; 1,3-dihydro - 1 - n - pentyl - 3,5,7 - trimethyl - 2H - azepin-2-one; 1,3 - dihydro - 1 - n - hexyl - 3,5,7 - trimethyl - 2H-azepin - 2 - one; 1,3-dihydro - 1 - allyl-3,5,7-trimethyl-2H - azepin - 2 - one; 1,3 - dihydro - 1 - (2 - methyl - 2-butenyl) - 3,5,7 - trimethyl - 2H - azepin - 2 - one; 1,3-dihydro-1-(4 - methyl - 2 - pentenyl)-3,5,7 - trimethyl-2H-azepin - 2 - one; 1,3-dihydro-1-(2-propynyl)-3,5,7 - trimethyl-2H-azepin - 2 - one; 1,3 - dihydro-1-(3-pentynyl)-3,5,7-trimethyl - 2H - azepin - 2 - one; 1,3 - dihydro - 1 - cyclopentyl - 3,5,7 - trimethyl - 2H - azepin - 2 - one; 1,3-dihydro - 1 - cyclohexyl - 3,5,7 - trimethyl - 2H-azepin-2-one; 1,3 - dihydro - 1 - (4 - tert-butylcyclohexyl)-3,5,7-trimethyl-2H-azepin - 2 - one; 1,3 - dihydro - 1 - benzyl-3,5,7-trimethyl-2H-azepin-2-one; and 1,3 - dihydro - 1 - (1-naphthylmethyl)-3,5,7 - trimethyl - 2H - azepin - 2 - one, respectively.

Following the procedure of Example 4 but substituting for the combination of 1,3 - dihydro - 3,5,7 - trimethyl-2H-azepin - 2 - one and methyl iodide as reactants, 1,3-dihydro-3,7-dimethyl - 2H - azepin - 2 - one plus isopropyl chloride; 1,3 - dihydro - 3,7 - dimethyl-2H-azepin-2-one plus cyclopentyl chloride; 1,3 - dihydro - 3,7 - diethyl-2H-azepin - 2 - one plus benzyl bromide; 1,3 - diethyl-2H-azepin - 2 - one plus benzyl bromide; 1,3 - dihydro-3,7-diethyl - 2H - azepin - 2 - one plus allyl bromide; 1,3 - dihydro - 3,7 - di - n - propyl-2H-azepin-2-one plus n-propyl iodide; 1,3 - dihydro - 3,7 - diisopropyl-2H-azepin-2-one plus 4 - tert - butylcyclohexyl chloride; 1,3-dihydro - 3,7 - diisobutyl - 2H - azepin-2-one plus n-propyl bromide; 1,3 - dihydro - 3,7 - di - n - butyl - 2H-azepin-2-one plus n-pentyl bromide; 1,3-dihydro - 3,5,7 - triethyl-2H-azepin - 2 - one plus 2-propynyl bromide; 1,3 - dihydro-3,7 - diethyl - 5 - methyl - 2H - azepin-2-one plus benzyl bromide; 1,3-dihydro - 3,7 - dimethyl - 5 - ethyl-2H-azepin-2-one plus n-hexyl chloride; 1,3 - dihydro-5-tert-butyl - 3,7 - dimethyl - 2H - azepin - 2 - one plus 1-naphthylmethyl chloride; 1,3 - dihydro - 3,7 - diisopropyl-5-methyl-2H-azepin-2-one plus allyl bromide; 1,3-dihydro-3,7-diisobutyl-5-n-propyl-2H-azepin-2-one plus n-propyl iodide; 1,3-dihydro-5-sec-butyl-3,7-dimethyl-2H-azepin-2-one plus 2-propynyl bromide; and 1,3-dihydro-3,5,7-triisopropyl-2H-azepin-2-one plus isopropyl chloride, there are obtained 1,3-dihydro-3,7-dimethyl-1-isopropyl-2H-azepin-2-one; 1,3-dihydro-1-cyclopentyl-3,7-dimethyl-2H-azepin-2-one; 1,3 - dihydro - 1 - benzyl-3,7-diethyl-2H-azepin-2-one; 1,3 - dihydro - 1 - allyl - 3,7 - diethyl - 2H - azepin-2-one; 1,3 - dihydro - 1,3,7 - tri - n - propyl - 2H - azepin-2-one; 1,3 - dihydro - 1 - (4-tert - butylcyclohexyl)-3,7-diisopropyl-2H-azepin - 2 - one; 1,3 - dihydro - 3,7 - diisobutyl-1-n-propyl - 2H - azepin - 2 - one; 1,3 - dihydro-3,7-di-n-butyl-1-n-pentyl-2H-azepin-2-one; 1,3 - dihydro - 1 - (2-propynyl)-3,5,7-triethyl - 2H - azepin - 2 - one; 1,3-dihydro-1-benzyl - 3,7 - diethyl - 5 - methyl-2H-azepin-2-one; 1,3-dihydro-3,7-dimethyl - 5 - ethyl-1-n-hexyl-2H-azepin-2-one; 1,3-dihydro-5-tert - butyl 3,7 - dimethyl - 1-(1-naphthylmethyl) - 2H - azepin - 2 - one; 1,3 - dihydro-1-allyl-3,7-diisopropyl-5-methyl-2H-azepin-2-one; 1,3 - dihydro-3,7-diisobutyl - 1,5 - di - n - propyl-2H-azepin-2-one; 1,3-dihydro-5-sec-butyl - 3,7 - dimethyl-1-(2-propynyl)-2H-azepin - 2 - one; and 1,3 - dihydro - 1,3,5,7 - tetraisopropyl-2H-azepin-2-one, respectively.

*Example 5.—1,4,6-Trimethyl-3-Oxo-2-Azabicyclo[3.2.2] Non-6-Ene-8,8,9,9-Tetracarbonitrile*

A solution of ethenetetracarbonitrile (3,2 g.; 0.025 mole) in 15 ml. of tetrahydrofuran was added to a solution of 1,3-dihydro-3,5,7-trimethyl - 2H - azepin-2-one (3.8 g.; 0.025 mole) in 15 ml. of tetrahydrofuran. The reaction mixture turned violet-brown in color. The mixture was stirred at about 25° C. for about 17 hours. The mixture became almost colorless after the first 30 minutes. Removal of the solvent by distillation at reduced pressure left 7.0 g. of a greyish solid; M.P. 195° C. with decomposition. Two recrystallizations from a mixture of ethyl acetate and hexane gave 1,4,6-trimethyl-3-oxo-2-azabicyclo[3.2.2]non-6-ene-8,8,9,9 - tetracarbonitrile in the form of white prisms; M.P. 195° C. with decomposition.

*Analysis.*—Calcd. for $C_{15}H_{13}N_5O$: C, 64.50; H, 4.69; N, 25.08. Found: C, 64.58; H, 4.74; N, 24.70. I.R. (principal bands, mineral oil mull) 3200, 2260, 1665 cm.$^{-1}$.

*Example 6.—1,2,4,6-Tetramethyl-3-Oxo-2-Azabicyclo [3.2.2]Non-6-Ene-8,8,9,9-Tetracarbonitrile*

A solution of ethenetetracarbonitrile (3.2 g.; 0.025 mole) in 15 ml. of tetrahydrofuran was added to a solution of 1,3-dihydro-1,3,5,7-tetramethyl - 2H - azepin-2-one (4.1 g.; 0.025 mole) in 15 ml. of tetrahydrofuran. The mixture developed a dark color immediately. The mixture was allowed to stand at about 25° C. for about 17 hours. Removal of the solvent by distillation at reduced pressure left a crystalline residue, which on recrystallization from a mixture of ethyl acetate and hexane, gave 5.4 g. of a white solid; M.P. 159–161° C. with decomposition. Two additional recrystallizations from the same pair of solvents gave 1,2,4,6-tetramethyl-3-oxo-2-azabicyclo[3.2.2]non-6-ene-8,8,9,9-tetracarbonitrile in the form of fine white needles; M.P. 167° C. with decomposition.

*Analysis.*—Calcd. for $C_{16}H_{15}N_5O$: C, 65.51; H, 5.15; N, 23.88. Found: C, 65.61; H, 4.98; N, 23.59.

*Example 7.—2-Ethyl-1,4,6-Trimethyl-3-Oxo-2-Azabicyclo[3.2.2]Non-6-Ene-8,8,9,9-Tetracarbonitrile*

A solution of ethenetetracarbonitrile (2.16 g; 0.0168 mole) in 10 ml. of tetrahydrofuran was added to a solution of 1,3-dihydro - 1 - ethyl-3,5,7-trimethyl-2H-azepin-2-one (3.0 g.; 0.0168 mole) in 15 ml. of tetrahydrofuran. After standing at about 25° C. for about 17 hours, the reaction mixture was refluxed for 1 hour. Removal of the solvent by distillation at reduced pressure left a solid residue which was slurried with hexane, filtered, and dried to give 4.7 g. of a greyish solid; M.P. 156–159° C. with decomposition. Three recrystallizations from a mixture of ethyl acetate and hexane gave 2-ethyl-1,4,6-trimethyl-3-oxo-2-azabicyclo[3.2.2]non-6 - ene - 8,8,9,9-tetracarbonitrile in the form of fine white blades; M.P. 170–171° C. with decomposition.

*Analysis*:—Calcd. for $C_{17}H_{17}N_5O$: C, 66.43; H, 5.58; N, 22.79. Found: C, 66.32; H, 5.49; N, 22.65.

Following the procedure of Example 5 but substituting for the 1,3-dihydro-3,5,7-trimethyl-2H-azepin-2-one,
  1,3-dihydro-3,7-dimethyl-2-H-azepin-2-one;
1,3-dihydro-3,7-diethyl-2H-azepin-2-one;
1,3-dihydro-3,7-di-n-butyl-2H-azepin-2-one;
1,3-dihydro-3,5,7-triethyl-2H-azepin-2-one;
1,3-dihydro-5-tert-butyl-3,7-dimethyl-2H-azepin-2-one;
1,3-dihydro-1-isopropyl-3,5,7-trimethyl-2H-azepin-2-one;
1,3-dihydro-1-cyclopentyl-3,7-dimethyl-2H-azepin-2-one;
1,3-dihydro-1-allyl-3,7-diethyl-2H-azepin-2-one;
1,3-dihydro-1-(2-propynyl)-3,5,7-triethyl-2H-azepin-2-one;
1,3-dihydro-1-(2-methyl-2-butenyl)-3,5,7-trimethyl-2H-azepin-2-one;
1,3-dihydro-1-(3-pentynyl)-3,7-dimethyl-2H-azepin-2-one;
1,3-dihydro-1-benzyl-3,7-diethyl-5-methyl-2H-azepin-2-one;

and 1,3-dihydro-1-(1-naphthylmethyl)-5-isobutyl-3,7-dimethyl-2H-azepin-2-one, there are obtained 1,4-dimethyl-3-oxo-2-azabicyclo[3.2.2]non-6-ene-8,8,9,9-tetracarbonitrile;
1,4-diethyl-3-oxo-2-azabicyclo[3.2.2]non-6-ene-8,8,9,9-tetracarbonitrile;
1,4-di-n-butyl-3-oxo-2-azabicyclo[3.2.2]non-6-ene-8,8,9,9-tetracarbonitrile;
1,4,6-triethyl-3-oxo-2-azabicyclo[3.2.2]non-6-ene-8,8,9,9-tetracarbonitrile;
6-tert-butyl-1,4-dimethyl-3-oxo-2-azabicyclo[3.2.2]non-6-ene-8,8,9,9-tetracarbonitrile;
2-isopropyl-1,4,6-trimethyl-3-oxo-2-azabicyclo[3.2.2]non-6-ene-8,8,9,9-tetracarbonitrile;
2-cyclopentyl-1,4-dimethyl-3-oxo-2-azabicyclo[3.2.2]non-6-ene-8,8,9,9-tetracarbonitrile;
2-allyl-1,4-diethyl-3-oxo-2-azabicyclo[3.2.2]non-6-ene-8,8,9,9-tetracarbonitrile;
2-(2-propynyl)-1,4,6-triethyl-3-oxo-2-azabicyclo[3.2.2]non-6-ene-8,8,9,9-tetracarbonitrile;
2-(2-methyl-2-butenyl)-1,4,6-trimethyl-3-oxo-2-azabicyclo[3.2.2]non-6-ene-8,8,9,9-tetracarbonitrile;
2-(3-pentynyl)-1,4-dimethyl-3-oxo-2-azabicyclo[3.2.2]non-6-ene-8,8,9,9-tetracarbonitrile;
2-benzyl-1,4-diethyl-6-methyl-3-oxo-2-azabicyclo[3.2.2]non-6-ene-8,8,9,9-tetracarbonitrile;

and 2-(1-naphthylmethyl)-1,4-dimethyl-6-isobutyl-3-oxo-2-azabicyclo[3.2.2]non-6-ene-8,8,9,9-tetracarbonitrile, respectively.

I claim:
1. A compound of the formula:

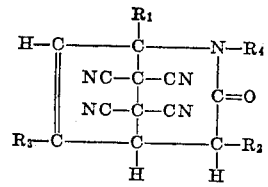

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, and wherein $R_4$ is selected from the group consisting of hydrogen, alkyl of 1 to 6 carbon atoms, inclusive, alkenyl of 3 to 6 carbon atoms, inclusive, alkynyl of 3 to 6 carbon atoms, inclusive, cycloalkyl of 5 to 10 carbon atoms, inclusive, and aralkyl of 7 to 11 carbon atoms, inclusive.

2. 1,4,6 - trimethyl - 3 - oxo - 2 - azabicyclo[3.2.2]non-6-ene-8,8,9,9-tetracarbonitrile.

3. 1,2,4,6-tetramethyl - 3 - oxo - 2 - azabicyclo[3.2.2]-non-6-ene-8,8,9,9-tetracarbonitrile.

4. 2-ethyl - 1,4,6 - trimethyl - 3 - oxo - 2 - azabicyclo-[3.2.2]non-6-ene-8,8,9,9-tetracarbonitrile.

5. A process for the preparation of a 3-oxo-2-azabicyclo[3.2.2]non-6-ene - 8,8,9,9 - tetracarbonitrile of the formula:

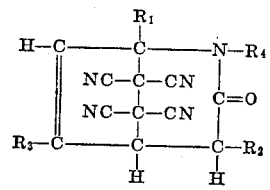

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, and wherein $R_4$ is selected from the group consisting of hydrogen, alkyl of 1 to 6 carbon atoms, inclusive, alkenyl of 3 to 6 carbon atoms, inclusive, alkynyl of 3 to 6 carbon atoms, inclusive, cycloalkyl of 5 to 10 carbon atoms, inclusive, and aralkyl of 7 to 11 carbon atoms, inclusive, which comprises mixing a compound of the formula:

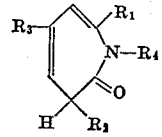

wherein $R_1$, $R_2$, $R_3$, and $R_4$ are as given above with ethenetetracarbonitrile, to form said 3 - oxo - 2 - azabicyclo-[3.2.2]non-6-ene-8,8,9,9-tetracarbonitrile.

References Cited in the file of this patent

Meinwald et al.: J.A.C.S., vol. 77, pp. 4401–4405 (1955).
Chapman et al.: J.A.C.S., vol. 84, pp. 1213–1219 (1962).
Middleton et al.: J.A.C.S., vol. 80, pp. 2783–8 (1958).